Patented Apr. 13, 1937

2,077,374

UNITED STATES PATENT OFFICE 2,077,374

CONCRETE MIXTURE AND METHOD OF MAKING THE SAME

Anton Grossinger, Milwaukee, Wis.

No Drawing. Application December 11, 1930, Serial No. 501,660

4 Claims. (Cl. 106—24)

This invention relates to a concrete mixture, including a new hydraulic binder, primarily for building purposes and is an improvement of the mixture disclosed in the application filed on the 23d day of February, 1928; Serial No. 256,485, and the application filed on the 13th day of December, 1929, Serial No. 413,860.

Cinders and divers other materials have heretofore been used in concrete mixtures in substitution of crushed stone and sand and such mixtures have many useful characteristics; they are economical, comparatively light in weight and of sufficient porosity to avoid dampness.

As far as I know, heretofore, ordinary cinders were used only in their natural condition, that is, without removing the dust, in making concrete mixtures, but such mixtures were not very porous.

It is the object of the present invention to create a substantially perfect porous concrete structure made out of a mixture of dustless aggregates of coal cinders or other relatively porous materials, combined with a silica- and magnesia-rich hydraulic coating binder material to coat the particles of said aggregates to prevent the sulphur of the unburned coal particles from acting upon the other ingredients.

In carrying out my invention, I use dustless coal cinders, coal slate, burnt coal slate, slate, pumice or other relatively porous material as a body or filler together with a mixture of a silica- and magnesia-rich hydraulic coating binder material, water and cement.

A very satisfactory mixture has been obtained by using the above referred to materials in a more or less uniform size, not larger than a small nut.

I make the silica- and magnesia-rich hydraulic coating binder material, which I have named "hyderit", from dolomite limestone which contains substantially the following ingredients:

(1) 27% of silica,
(2) 1.30% of iron and aluminum oxides,
(3) 39.70% of calcium carbonate,
(4) 32.00% of magnesium carbonate, by burning the raw stone at a temperature just below the sintering point whereupon all the free lime is eliminated and a clinker crust is formed on the stone. I then break up said burnt material in a mill into the form of a powder similar to but not as fine as cement. Said powdered material forms an excellent binder material, and as a binder it is extremely slow in setting, becomes very hard and is considerably cheaper than cement. Besides being a good binder in making porous concrete mixtures it also serves to completely coat the porous aggregate (cinder, etc.) and thus thoroughly encloses any unburned coal particles that may be present and thereby prevents the sulphur, still present in such particles, from acting upon the other ingredients in the concrete mixture to cause deterioration.

When using said silica- and magnesia-rich material as a water resisting binder I add about 12% soft coal or wood ashes to the dolomite stone before burning.

In making cinder concrete, the best results are obtained by crushing the mass of cinders and clinker lumps as they come from a furnace and separate the dust and fine ashes therefrom. Said dustless cinder mass is then used in substantially the following proportion to form a concrete mixture.

(1) Eight parts of dustless cinders.
(2) One part of silica- and magnesia-rich hydraulic coating binder material.
(3) One-half part of cement.
(4) Necessary water.

The other relatively porous materials referred to above may be used in a similar manner to make concrete mixtures.

The dust and fine ashes obtained by cleaning cinders may be utilized as a substitute for sand in the preparation of mortar for laying cinder blocks. The following is an example of such a mortar mixture:

(1) Three parts of cinder dust including fine ashes.
(2) One-half part of silica- and magnesia-rich hydraulic coating binder material.
(3) One-fourth part of cement.
(4) One-fourth part of slacked lime.
(5) Necessary water.

If the mortar is to be used in masonry structures submerged in water or structures which are intermittently exposed to water or moisture I make it in the following manner:

(1) Two parts of sharp edged clean sand.
(2) One part of silica- and magnesia-rich hydraulic coating binder material.
(3) One-half part of cement.
(4) One-fourth part of slacked lime.
(5) Necessary water mixed with substantially 12% potash and 10% cocoanut oil.

The last above referred to ingredient is made by boiling the water, potash and cocoanut oil together, and is mixed with the other ingredients of the mortar cold.

Products, such as blocks or slabs formed from my porous concrete disclosed above may be damp-proofed by immersing them in a bath which consists of a solution of water mixed with about 12% of potash and 12% cocoanut oil boiled together.

To produce a coating material which is both water- damp- and sulphur-proof I add 5% of the above referred to silica- and magnesia-rich hydraulic binder material to the water-potash-cocoanut oil solution.

It will be understood that the details that have been given above are for the purpose of illustration, not restriction, and that variations within the spirit of the invention are intended to be included within the scope of the appended claims.

I claim:

1. A concrete mixture for making porous and air-penetrable bodies comprising an aggregate of small particles of dustless coal cinders, cement and a water resisting coating binder consisting of burnt powdered dolomite limestone having an analysis of

| | Per cent |
|---|---|
| Silica | 27 |
| Iron and aluminum oxides | 1.30 |
| Magnesium carbonate | 32 |
| Calcium carbonate | 39.70 | and to which has been added 12% of wood-ash before burning.

2. A concrete mixture for making porous and air-penetrable bodies comprising eight parts of dustless cinders, one-half part of cement and one part of silica- and magnesia-rich hydraulic coating binder material made by burning 12% of wood ashes and dolomite limestone having an analysis of

| | Per cent |
|---|---|
| Silica | 27 |
| Iron and aluminum oxides | 1.30 |
| Magnesium carbonate | 32 |
| Calcium carbonate | 39.70 |

3. The process of making porous concrete bodies comprising crushing burnt coal, removing the dust from the crushed aggregate, mixing water, cement and a hydraulic coating binding material made by burning 12% wood ashes and dolomite limestone having an analysis of

| | Per cent |
|---|---|
| Silica | 27 |
| Iron and aluminum oxides | 1.30 |
| Magnesium carbonate | 32 |
| Calcium carbonate | 39.70 | with the said dustless crushed aggregate and then molding the said mixture into structural building bodies.

4. The process of making a hydraulic coating binder material comprising mixing about 12% of wood-ash with dolomite limestone having an analysis of

| | Per cent |
|---|---|
| Silica | 27 |
| Iron and aluminum oxides | 1.30 |
| Magnesium carbonate | 32 |
| Calcium carbonate | 39.70 | burning said mixture at a temperature just below the sintering point to eliminate the free lime in the limestone and form a clinker crust on said stone and then grinding said burnt-material into the form of powder.

ANTON GROSSINGER.